(12) United States Patent
Philipp (10) Patent No.: US 7,969,330 B2
(45) Date of Patent: Jun. 28, 2011

(54) TOUCH SENSITIVE CONTROL PANEL (75) Inventor: Harald Philipp, Southampton (GB)

(73) Assignee: Atmel Corporation, San Jose, CA (US)

( * ) Notice: Subject to any disclaimer, the term of this patent is extended or adjusted under 35 U.S.C. 154(b) by 218 days.

(21) Appl. No.: 11/163,944

(22) Filed: Nov. 4, 2005

(65) Prior Publication Data

US 2006/0038793 A1 Feb. 23, 2006

Related U.S. Application Data

(63) Continuation-in-part of application No. 10/956,214, filed on Oct. 1, 2004, now abandoned.

(30) Foreign Application Priority Data

Oct. 8, 2003 (GB) .................................. 0323570.2

(51) Int. Cl.
*H03M 11/00* (2006.01)

(52) U.S. Cl. ............. 341/33; 341/20; 341/21; 341/22; 341/26; 345/172; 345/173; 345/174; 345/175; 702/127; 702/150

(58) Field of Classification Search .............. 341/20, 341/21, 33, 26, 22; 345/172–175; 219/445.1, 219/446.1, 447.1, 448.11, 448.13, 483, 506, 219/518; 126/90 A, 92 A, 217; 715/864; 702/150, 127; 200/512; 178/18.03, 18.06

See application file for complete search history.

(56) References Cited

U.S. PATENT DOCUMENTS

| | | | |
|---|---|---|---|
| 4,121,204 A | | 10/1978 | Welch et al. |
| 4,233,522 A | * | 11/1980 | Grummer et al. ............. 341/33 |
| 5,097,113 A | | 3/1992 | Aoyama |
| 6,757,002 B1 | * | 6/2004 | Oross et al. ................... 715/864 |
| 6,949,723 B2 | * | 9/2005 | Staebler et al. ............ 219/445.1 |
| 2002/0191029 A1 | * | 12/2002 | Gillespie et al. .............. 345/810 |
| 2003/0028346 A1 | * | 2/2003 | Sinclair et al. ................ 702/150 |
| 2003/0121767 A1 | * | 7/2003 | Caldwell ...................... 200/512 |
| 2006/0016800 A1 | * | 1/2006 | Paradiso et al. .............. 219/497 |

FOREIGN PATENT DOCUMENTS

| | | |
|---|---|---|
| DE | 7836484 U1 | 5/1979 |
| DE | 19645907 A1 | 5/1998 |
| DE | 29911917 U1 | 11/1999 |
| DE | 10026058 A1 | 11/2001 |
| DE | 10133135 A1 | 1/2003 |

(Continued)

*Primary Examiner* — George A Bugg
*Assistant Examiner* — Sisay Yacob
(74) *Attorney, Agent, or Firm* — Baker Botts L.L.P.

(57) ABSTRACT

An apparatus for controlling functions of an appliance is described having a touch-sensitive control panel resistant to accidental activation. The touch-sensitive panel has a plurality of proximity sensor areas which may be selected by a user wishing to activate associated functions of the appliance. Driver circuitry coupled to the sensor areas is operable to output detection signals to a controller in response to a user selecting ones of the sensor areas. The controller is configured to activate functions of the appliance in response to these detection signals. For one or more functions of the appliance, for example a switching on function, the controller is configured to only activate the function when a user makes a predetermined combination of at least two selections from the plurality of sensor areas. This reduces the chances of potentially dangerous functions being activated inadvertently and can further help a designer to provide an intuitive and uncluttered appearance to the control panel.

18 Claims, 7 Drawing Sheets

FOREIGN PATENT DOCUMENTS

| | | |
|---|---|---|
| EP | 0729292 B1 | 8/1996 |
| EP | 0859296 B1 | 8/1998 |
| EP | 1273851 A2 | 1/2003 |
| GB | 1603862 | 12/1981 |
| GB | 2385947 A | 9/2003 |
| WO | WO 03/044958 A2 | 5/2003 |

* cited by examiner

| STEP | S1 | S2 | S3 | FUNCTION |
|---|---|---|---|---|
| A | - | X | X | RESET ALL |
| B | - | - | - | DEADTIME |
| C | X | - | - | CHARGE-TRANSFER |
| D | - | - | - | DEADTIME |
| E | - | X | - | HOLD |
| F | - | X | - | MEASURE | loop: B→E

| STEP | A & A' | B & B' | C & C' | FUNCTION |
|---|---|---|---|---|
| A | X | - | X | RESET Cs1 and Cs2 |
| B | - | - | - | DEADTIME |
| C | - | X | - | CHARGE Cs1 and Cs2 |
| D | - | - | - | DEADTIME |
| E | X | - | - | CLAMP SENSOR AREA TO GROUND |
| F | X | - | - | MEASURE VOLTAGE ON Cs1 and Cs2 |

TOUCH SENSITIVE CONTROL PANEL

BACKGROUND INFORMATION

The invention relates to touch-sensitive control panels, also known as touch screens, for controlling appliances.

Touch-sensitive control panels are becoming more common in domestic appliances. In addition to providing more aesthetically pleasing control interfaces, touch-sensitive control panels provide more flexibility than more conventional control panels based on mechanical switches and rotary knobs. Touch-sensitive control panels are also less prone to failure through use due to their lack of moving parts. Touch-sensitive control panels can allow for a sealed interface between a user and the inside of a domestic appliance. This prevents spilt fluid or other debris from entering a domestic appliance through the gaps which surround conventional mechanical switches and knobs. A touch-sensitive control panel additionally provides a surface which can easily be wiped clean. This makes them more hygienic that more conventional control panels as there are no crevices or joints in which dirt may accumulate.

However, a problem with touch-sensitive screens in that they can be prone to accidental activation. A conventional electric hob control might include a rotary dial which is 'clicked-on' from an off position to activate the hob. The rotary dial may then be further rotated to select a desired temperature for the hob. This kind of control require a specific rotary action to operate. In addition, the mechanical resistance of the control, for example the force required for it to be 'clicked-on', can be chosen to reduce the chance of accidental activation. This means it is unlikely that a child or a pet, for example, could activate the hob control unintentionally. A hob having a touch-sensitive control panel can more easily be activated by a child playing with the hob or a pet walking over the control panel. This can make such hobs, and other appliances having touch-sensitive control panels, potentially significant sources of danger. Furthermore, when a hob, or other appliance, with a touch-sensitive control panel is in normal use it can be relatively easy to accidentally change the appliance settings, for example the temperature of a hob, merely by brushing past the control panel when reaching across the appliance or when attempting to adjust some other function of the hob. This is undesirable since it prevents the appliance from functioning as the user intends, and how he believes it to be, operating.

SUMMARY OF THE INVENTION

According to a first aspect of the invention, there is provided an apparatus for controlling functions of an appliance comprising: a touch-sensitive control panel having a plurality of proximity sensor areas; driver circuitry operable to output detection signals in response to selection of the proximity sensor areas; and a controller operable to receive said detection signals from the driver circuitry and activate different functions of the appliance in response thereto, wherein the controller is operable to activate at least one function of the appliance in response to receipt of a pre-determined combination of at least two of said detection signals.

By allowing certain functions of the appliance to be activated only in response to a pre-determined combination of at least two selections from the plurality of proximity sensor areas, the chance of accidentally activating these functions is reduced. This provides for a domestic appliance which benefits from the advantages of a touch-sensitive control panel but does not suffer the drawback of being prone to inadvertent activation. This provides for a safer appliance. The complexity of the predetermined combination may be selected according to the level of protection against inadvertent activation required. In addition, an elegant and uncluttered control panel can be designed whereby a number different functions are associated with a relatively small number of common sensor areas, the functions being activated according to different pre-determined combinations.

The pre-determined combination may correspond to a user selecting at least two different proximity sensor areas or to a user selecting a single proximity sensor area at different times. To further reduce the chances of inadvertent activation, the pre-determined combination of at least two selections may need to be made within a specified time period. For example, the combination of selections may need to be made within a time period less than 5, 4, 3, 2, 1, 0.5 or 0.1 seconds. Similarly, selections made within the combination may need to separated by a minimum time such that the specified time within which they are made is more than 0.1, 0.2, 0.3, 0.4, 0.5, 1, 2 or 5 seconds, in order to activate the function with which they are associated.

In some embodiments of the invention, a function of the appliance activated in response to a user making the pre-determined combination of at least two selections may be subsequently cancelled by the user making only one of the selections comprising the pre-determined combination. For example, a user may be required to select both of two separate proximity sensor areas within a one-second time period in order to switch on an appliance from a stand-by mode. If these two sensor areas are closely spaced, the user can switch on the appliance with a simple sliding motion of his finger from one sensor area to the other. To avoid the need for separate sensor areas for switching the appliance off, the sensor areas associated with switching on the appliance can also be used to switch the appliance off. If desired this can require a similar combination of selections as are required to switch the appliance on. However, in general it is less dangerous to have an appliance accidentally switched off. For safety reasons, switch off should also be an easy operation to perform. It may thus be considered preferable to allow the user to switch off the appliance by selecting any one of the two sensor areas used to switch on the appliance without requiring any predetermined combination of selections to be made.

In many appliances the use of a position sensitive proximity sensor area for which the driver circuitry is operable to output a detection signal dependent on the position of a touch within said position sensitive proximity sensor can assist operation of the appliance. For example a variable operating parameter of the appliance, such as temperature of a hob or speed of a food blender or washing machine drum, can be varied according a position detected by the position sensitive proximity sensor area. This provides a rapid and intuitive way for a user to set a variable parameter. In order to configure the position sensitive proximity sensor area to vary the variable operating parameter of the appliance, a user may be required to make a pre-determined combination of at least two selections from the plurality of proximity sensor areas, one of which being a selection of the position sensitive proximity sensor. This can help to provide against inadvertent adjustment of the variable parameter. In addition by allowing different variable operating parameters of the appliance, e.g. the temperatures of different heating elements in an oven, to be adjusted with the same position sensitive proximity sensor depending on other selected sensor areas, a number of different variable parameters may be adjusted by a control panel having only one position sensitive proximity sensor area. Position sensitive proximity sensor areas are generally relatively complex and extend over a larger area than more basic binary detectors. Accordingly, a simple and uncluttered control panel can be provided.

Depending on how a designer wishes a control panel to appear, linear or rotary position sensitive proximity sensor areas may be used. For example where a variable operating parameter of an appliance is adjusted using a position sensitive proximity sensor, this can be a rotary position sensitive proximity sensor area disposed around a central proximity sensor areas. The central and rotary position proximity sensor areas may both need to be selected during adjustment of the variable operating parameter of the appliance. This provides for a neat and intuitive control panel layout.

A portion of an upper surface overlaying at least one of the proximity sensor areas may be recessed to assist a user's finger to be positioned during selection, for example, when selecting or adjusting a rotary proximity sensor area.

According to second aspect of the invention there is provided a method of controlling an appliance having a touch-sensitive control panel comprising a plurality of proximity sensor areas in response to a user input, comprising: receiving first and second detection signals corresponding to first and second proximity sensor area selections; and activating a function of the appliance conditional on the first and second proximity sensor area selections corresponding to a pre-determined combination of first and second proximity sensor area selections associated with that function.

The pre-determined combination of first and second proximity sensor area selections associated with the function may correspond to a user selecting two different two proximity sensor areas or to a user selecting a single proximity sensor area at different times.

Furthermore, the pre-determined combination of first and second proximity sensor area selections associated with the function may correspond to a user making the first and second proximity sensor area selections within a specified time period, such as within 5, 4, 3, 2, 1, 0.5 or 0.1 seconds. Alternatively the pre-determined combination may correspond to the user making the selection in a time period which exceeds a specified time period, e.g. in a time greater than 0.1, 0.2, 0.3, 0.4, 0.5, 1, 2 or 5 seconds.

The pre-determined combination of first and second proximity sensor area selections associated with the function may correspond to a user selecting different portions of a single position sensitive sensor area. For example, a function could be activated in response to a user sliding a finger across a linear position sensitive sensor area.

According to a third aspect of the invention there is provided a method of activating a function of an apparatus having a touch-sensitive control panel including a plurality of proximity sensor areas arranged on a surface, the method comprising: selecting a first proximity sensor area by placing an object in a position adjacent the first proximity sensor area; selecting a second proximity sensor area by sliding the object across the surface of the control panel from its position adjacent the first proximity sensor area to a position adjacent the second proximity sensor area; and activating the function of the apparatus conditional on the first and second proximity sensor areas being selected within a pre-determined time period.

The function may be to switch on the apparatus, for example. The apparatus may be configured such that it may then be subsequently switched off by activation of one of, or one or other of, the first or second proximity sensor areas.

BRIEF DESCRIPTION OF THE DRAWINGS

For a better understanding of the invention and to show how the same may be carried into effect, reference is now made by way of example to the accompanying drawings in which.

DETAILED DESCRIPTION

Figure 1:
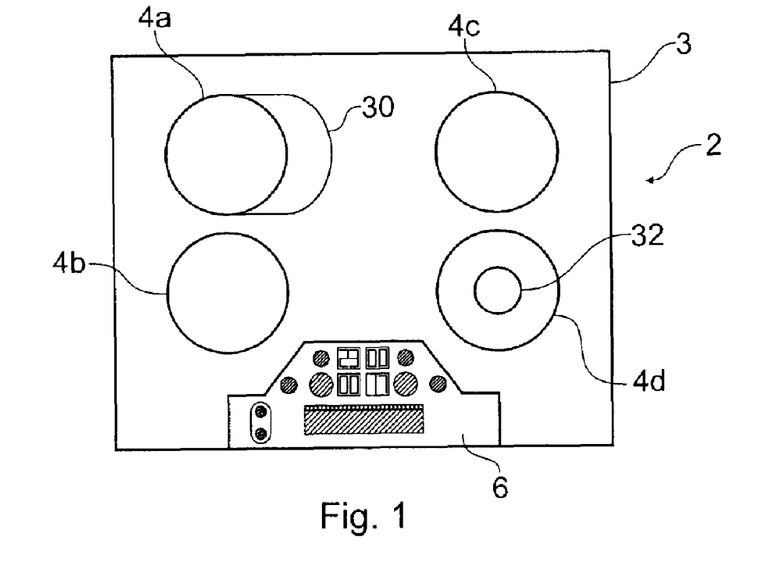
FIG. 1 schematically shows a plan view of a hob according to a first embodiment of the invention.

FIG. 1 schematically shows a plan view of a domestic appliance according to a first embodiment of the invention. The appliance is a hob 2. The hob 2 has an upper surface which comprises a heat resistant glass top 3. The glass top is continuous over the upper face of the hob. This continuous glass top 3 is easy to clean and does not allow fluid or debris to enter the inside of the hob. Below the glass top are mounted four individually adjustable heating elements 4a-d and a control panel 6. The control panel allows a user to control various functions of the hob, for example switching it on and off and adjusting the temperature of the heating elements. The heating elements 4a-d are of the kind conventionally used with glass-topped hobs.

Figure 2:
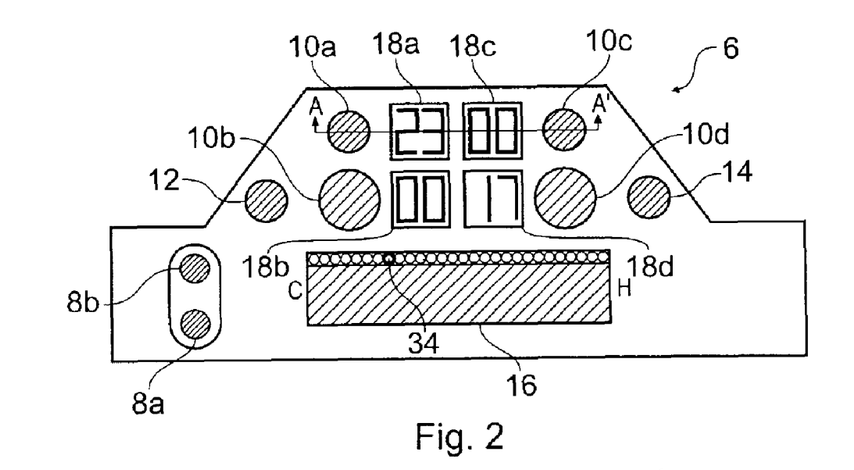
FIG. 2 schematically shows a plan view of a control panel of the hob shown in FIG. 1 on an expanded scale.

FIG. 2 schematically shows a plan view of the control panel 6 of the hob 2 shown in FIG. 1 on an expanded scale. The touch-sensitive control panel 6 in this example is a capacitance-based control panel. Although control panels of this type are commonly referred to as touch-sensitive control panels, it will be understood that it is not strictly necessary for a user to actually touch the control panel to make a selection. A selection can also be made by a user placing his finger (or other pointer) close to a sensor area he wishes to select. How close a user need place his finger to make a selection will depend on the sensitivity of the control panel. The control panel 6 comprises a plurality of proximity sensor areas 8a, 8b, 10a-d, 12, 14, 16 defined by conductors mounted beneath the glass top 3 of the hob 2. In this example, the conductors comprising the sensor areas are attached directly to the underside of the glass top 3. In other examples they may be mounted on a separate element positioned adjacent the underside of the glass top. Markings are provided on the control panel to inform a user as to the functions associated with different ones of the sensor areas. In this example, the conductors comprising the sensor areas are assumed to be visible to a user, however, in other examples the sensor areas will not be visible, for example where the glass top is made of smoked glass, and markings on the control panel will also be used to outline where the sensor areas are located beneath the glass top. The control panel also includes information displays 18a-d, again mounted below the glass top 3. These information displays inform a user as to the hob's current status, for example the fraction of available power being supplied to each of the heating elements.

Figure 3:
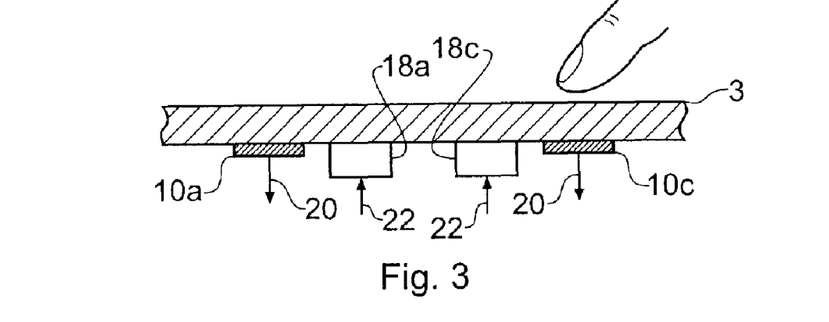
FIG. 3 schematically shows a partial vertical section view of the control panel of FIG. 2.

FIG. 3 schematically shows a partial vertical section view of the control panel 6 of FIG. 2 taken along line A-A' shown in FIG. 2. A section of the glass top 3 is apparent with sensor areas 10a and 10c and the information displays 18a and 18c being seen in profile. Sensor areas 10a, 10c are connected to driver circuitry (not shown) by connections 20. Information displays 18a, 18c are connected to a controller (not shown) by connections 22. Also shown in FIG. 3 is a user's finger positioned to select sensor area 10c.

Figure 4:
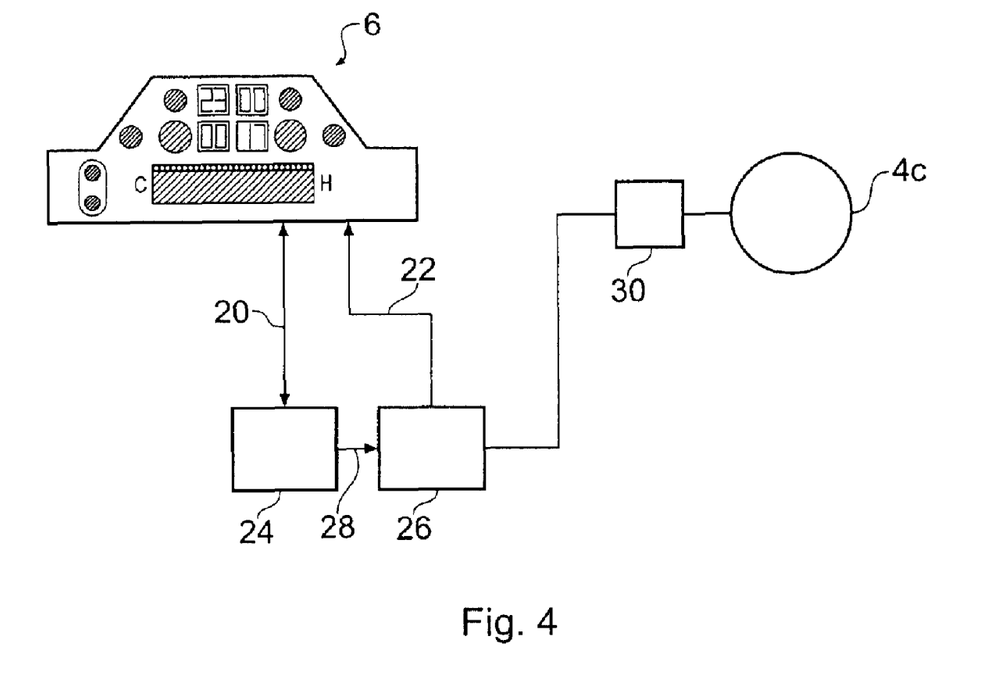
FIG. 4 schematically shows the interconnections between the control panel of FIG. 2, driver circuitry for driving proximity sensor areas of the control panel, a controller, an electronically controlled triac and a heater element of the hob.

FIG. 4 schematically shows the interconnections between the control panel 6, the driver circuitry 24 for driving the sensor areas, the controller 26, an electronically controlled triac 30 and one of the heater elements 4c. The driver circuitry 24 is operable to output detection signals to the controller 26 along connection 28 in response to a user selecting ones of the sensor areas. In the example control panel shown in FIG. 2, the driver circuitry 24 is operable to output a binary detection signal (i.e. finger "present" or "not present" in the vicinity of the sensor area) for each of the sensor areas 8a, 8b, 10a-d, 12 and 14. A user may select one of these sensor areas by placing his finger (or other pointer) over the corresponding sensor area.

Figure 5:
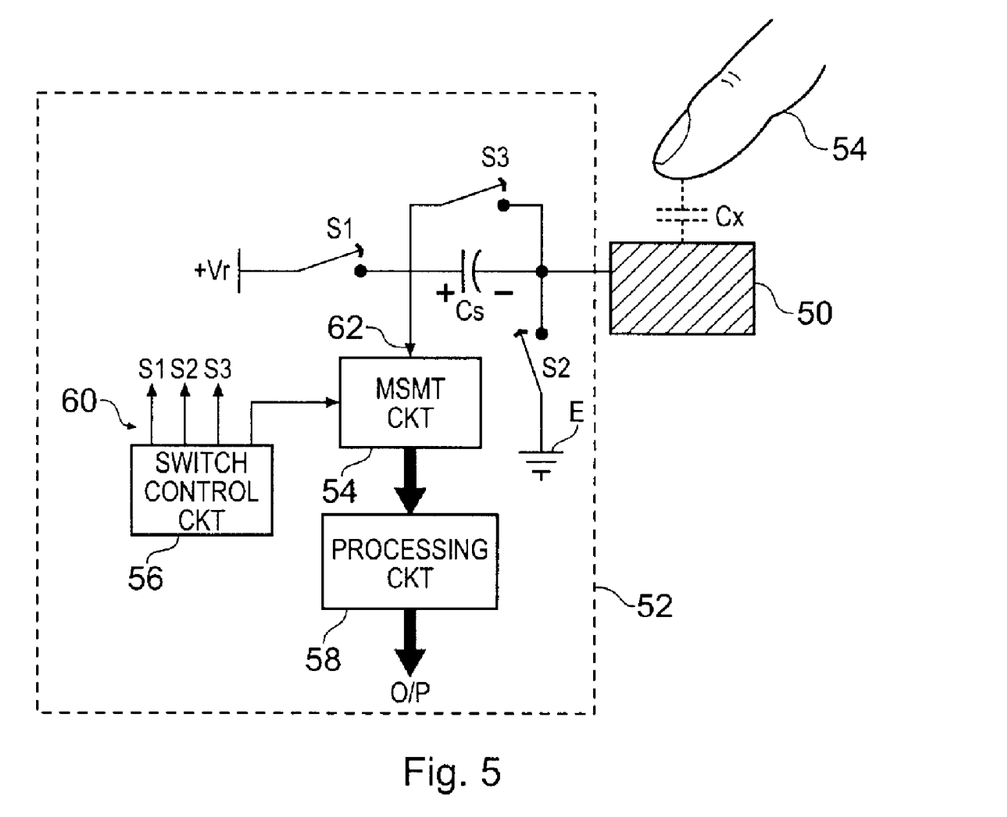
FIG. 5 is a schematic circuit diagram showing an example configuration of a proximity sensor area employed in the control panel of FIG. 2 and associated driver circuitry.

FIG. 5 is a schematic circuit diagram showing an exemplar configuration of a sensor area 50 and associated driver circuitry 52. The sensor area 50 is an electrically conducting plate. This configuration may be used in the above described hob for sensor areas 8a, 8b, 10a-d, 12 and 14. These are the sensor areas for which the driver circuitry is operable to output a binary detection signal based on whether a finger 54 (or other object) is in the proximity of the sensor area 50. For simplicity, only the driver circuitry 52 associated with the single example sensor area 50 is shown. It will be appreciated, however, that the driver circuitry will generally include similar parts associated with other sensor areas.

The driver circuitry 52 shown in FIG. 5 comprises measurement circuitry 54, switch-control circuitry 56, processing circuitry 58, first, second and third switching elements S1, S2, S3 and a sampling capacitor Cs. These elements are interconnected as shown in the figure. The driver circuitry 52 is powered by a single rail direct current (DC) power supply which operates between a system ground E and a supply voltage +Vr. The switching elements S1, S2 and S3 used here are electronic relay switches driven by control signal lines 60 from the switch control circuitry 56. The switch control circuitry 56 also controls activation of the measurement circuitry 54. The driver circuitry 52 operates to monitor the capacitance of the sensor area 50. When the finger 54 is not proximate to the sensor area 50, the sensor area capacitance has a first, or "non-selected", value. When the finger 54 is brought close to the sensor area 50, the capacitance of the sensor area increases to a second, or "selected", value. The capacitance of the sensor area is schematically indicated in FIG. 5 by the dashed capacitor symbol labeled Cx. The sampling capacitor Cs is chosen to have a capacitance significantly higher than the expected values of Cx. The driver circuitry 52 monitors the capacitance Cx using charge transfer techniques governed by controlled switching of the switching elements S1, S2, S3.

Figure 6:
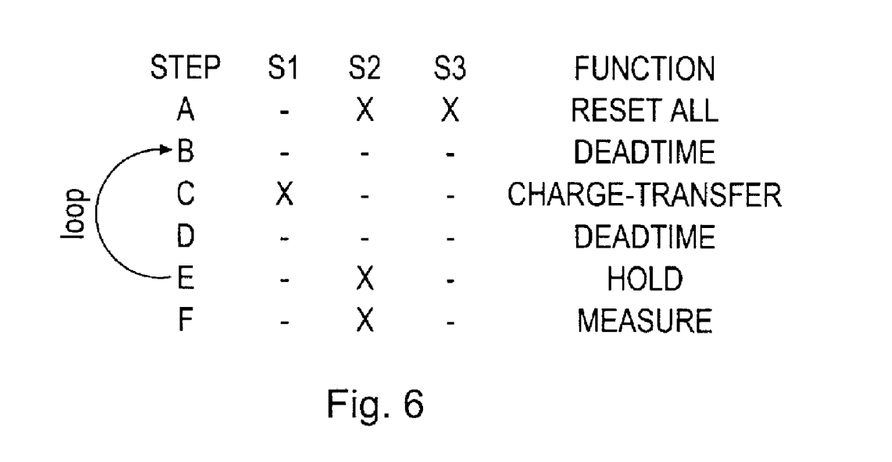
FIG. 6 is a table showing a switching sequence for switching switches in the driver circuitry shown in FIG. 5.

FIG. 6 shows an exemplar switching sequence which may be used to monitor the capacitance Cx. The sequence comprises six steps A-F. The duration of each step may, for example, be on the order of milliseconds. Significantly longer or shorter durations may also be used depending on desired detection characteristics (e.g. desired rate of sampling). The status of each of the switching element S1, S2, S3 at each step is indicated in the table. An "X" indicates that a switching element is closed and a "-" indicates that a switching element is open. A brief comment is also included in the table under the heading "FUNCTION" to summarize the purpose of each step.

In step A, switching elements S2 and S3 are closed to clear any electric charge on the sampling capacitance Cs and the capacitance Cx provided by the sensor area 50. This is known as a "reset all" step. In step B, all switching elements S1, S2, S3 are held open for a period known as a dead-time. The dead-time is inserted at step B to prevent accidental closure of all three switching elements at the same time, thus shorting out the power supply, which may occur during an overlap period were step C to immediately follow step A. After a suitable dead time, the switching elements S1, S2, S3 are configured as shown in step C of FIG. 6. In this step, S1 is closed to allow Cs and Cx to be charged from the power supply. This results in electric charge being held on both Cs and Cx. In step D, switching element S1 is opened for a further dead time period. The dead-time is inserted at step D to prevent accidental closure of switching elements S1 and S2 at the same time, thus charging Cs to +Vr, which may occur during an overlap period were step E to immediately follow step C. Kirchoff's current law and the principle of charge conservation dictate that the charges on Cs and Cx, namely Qs and Qx, are equal. However, because Cs is greater than Cx, a greater residual voltage Vx is present on Cx, and conversely, a lower voltage Vs is present on Cs.

In step E, switching element S2 is closed. This clears the voltage Vx on Cx by shorting the sensor area 50 to ground. At this stage the measurement circuitry, which in this example is an analogue-to-digital converter configured to measure the voltage applied at input terminal 62 relative to ground, could be used to determine Vc. From Vc, the voltage Vx which was present on the sensor area 50 in step D (i.e. before it was connected to ground) can be determined and the capacitance Cx of the sensor area obtained using the standard voltage divider equations for capacitances in series. However, because Cx is likely to be small, the voltage Vs on the sampling capacitor will also be small. This can make Vs difficult to measure accurately. Accordingly, in this example, the switch control circuitry loops through steps B to E a predetermined number of times in order to build up charge on the sampling capacitor Cs. This provides a larger measurable voltage on Cs due to the increased accumulation of charge and so provides greater accuracy and sensitivity without requiring active amplifiers.

After looping through steps B to E a pre-determined number of times, for example 100 times, the measurement circuitry 54 is configured by the switch control circuitry to measure the voltage Vs at step F with switching element S2 closed. The measured voltage Vs is passed to the processing circuitry 58. Vs depends on the number of loops made through steps B to E shown in FIG. 6 (i.e. the number of charge accumulations) and the value of Cx. The processing circuitry contains logic operable to determine Cx from Vs and the pre-determined number of loops performed during charge build up. Based on a comparison of the calculated value of Cx with a threshold value Tx, where Tx corresponds to a value of Cx when finger 54 is not present, the processor can determine whether or not finger 54 is proximate to the sensor area, i.e. whether the sensor area has been selected by a user. An appropriate threshold Tx can determined by measuring Cx during a calibration phase, e.g. on initial power up or routinely at specified periods during use. If the processing circuitry determines that Cx significantly exceeds the threshold Tx, the finger 54 is considered sufficiently proximate to the sensitive area to represent a positive selection of that sensor area by a user. When a positive selection is identified, the processing circuitry outputs a detection signal, identified in FIG. 5 as O/P, to the controller 26 shown in FIG. 4. The detection signal identifies the selected sensor area so that the controller can respond accordingly.

The amount by which the calculated capacitance Cx must exceed Tx to provide a positive detection will depend on how sensitive the designer wishes the control panel to be. For example, where there are a number of closely spaced sensor areas, it will be preferable to require a more significant increase in Cx over the threshold Tx to generate a positive detection so as to avoid one sensor area being unduly affected by a finger being placed over a nearby sensor area. In particular, to minimize false-positive detections, the amount by which Cx must exceed Tx to indicate a positive selection may be set such that a user has to physically touch the glass overlaying a sensitive area he wishes to select before a sufficient increase in capacitance of the sensor area occurs.

Although in the above described switching sequence a measurement of Vs is made after a fixed number of loops through steps B to E, in other examples a variable number of loops can be used. In these examples the measurement circuitry may comprise a comparator arranged to identify when Vs exceeds a pre-defined reference voltage, for example half of +Vr. The number of cycles taken to achieve this is dependent on Cx. Accordingly, a count of the number of loops undertaken before Vs exceeds the reference voltage can be used by the processing circuitry to determine Cx. This scheme has the advantage of using relatively basic comparator circuitry within the measurement circuitry rather than more complex analogue-to-digital converter circuitry.

Although described above as separate circuitry elements, the functionality of the switch control circuitry, the measurement circuitry and the processing circuitry may all be provided by a single general purpose programmable microprocessor or other integrated chip, for example a field programmable gate array (FPGA) or application specific integrated chip (ASIC). It will also be appreciated that corresponding circuitry for other sensor areas can be included in the same package as a single chip as well as circuitry associated with other aspects of the hob, e.g. circuitry associated with the controller 26. Some aspects of the driver circuitry 52 shown in FIG. 5 may be common to other sections of driver circuitry associated with other sensor areas. For example, if the measurements made for each sensor area are appropriately time-domain multiplexed by the switch control circuitry, there is no requirement for each sensor area to have its own measurement circuitry.

It will be appreciated that many other configurations of driver circuitry and sensor area can be used, however, circuitry based on the above described principles is relatively simple and effective and has good detection characteristics.

Sensor area 16 is different from the other sensor areas in that it is a position sensitive sensor area and the driver circuitry is correspondingly operable to output a detection signal indicative of the position of a user's finger within this sensor area. This type position sensitive sensor area is sometimes referred to as a slider sensor area. The slider sensor area 16 could comprise a number of closely spaced individual sensor areas having associated driver circuits of the kind shown in FIG. 4 and operating individually as described above. However, to improve positioning resolution while also reducing component count, a different kind of sensor area and associated driver circuitry is used.

Figure 7:
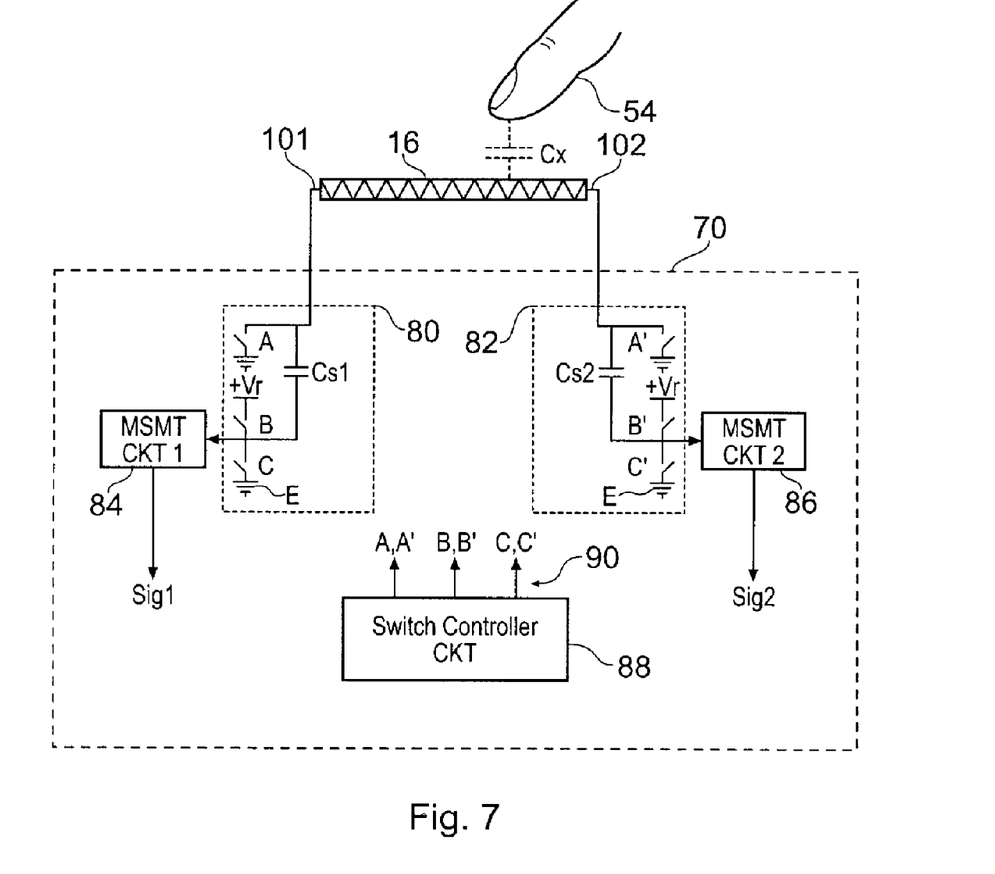
FIG. 7 is a schematic circuit diagram showing an example configuration of a position sensitive proximity sensor area employed in the control panel of FIG. 2 and associated driver circuitry.

FIG. 7 is a schematic circuit diagram showing the slider sensor area 16 and associated driver circuitry 70. For simplicity, only the driver circuitry associated with the slider sensor area 16 is shown. It will be appreciated, however, that the driver circuitry also includes parts associated with the other sensor areas.

The slider sensor area 16 comprises a resistive sensing strip having end terminations 101 and 102. The sensor area 16 is bonded to the underside of the glass top of the hob. In this example, the resistive sensing strip comprising the sensor area is formed from carbon film. However, other metal films, ITO or SnO, conductive plastics, screen deposited conductors, sputtered conductors etc. could also be used.

The driver circuitry 70 effectively comprises two sensing channels, one associated with each of the terminations 101, 102 of the sensor area 16. The driver circuitry includes first and second measurement circuits 84, 86, first and second switching circuits 80, 82, and switch control circuitry 88. The first switching circuit comprises first, second and third switching elements A, B, C and a first sampling capacitor Cs1 interconnected as shown in the figure. The second switching circuit is similar to the first and comprises fourth, fifth and sixth switching elements A', B', C' and a second sampling capacitor Cs2 interconnected as shown in the figure. The driver circuitry 52 is powered by a single rail DC power supply which operates between a system ground E and a supply voltage +Vr.

Figure 8:
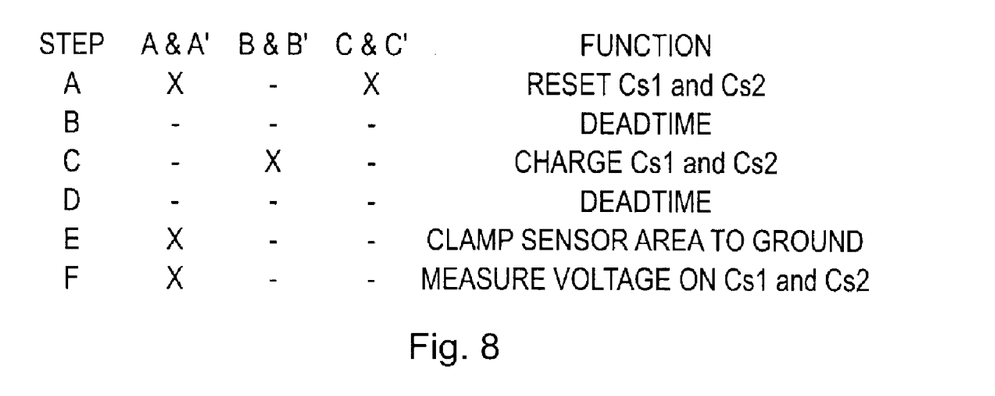
FIG. 8 is a table showing a switching sequence for switching switches in the driver circuitry shown in FIG. 7.

The switching elements A, A', B, B', C, C' are driven by control signal lines 90 from the switch control circuitry 88. The sensing channels are made to operate in time-synchronous fashion so that the two sets of switches A, B, C and A', B', C' operate in a substantially simultaneous manner. The sequence of switching is shown in FIG. 8. FIG. 8 is similar to and will be understood from FIG. 6. The first and second measurement circuits 84 and 88 comprise analogue-to-digital converters. The switch control circuitry manipulates the switches as shown in FIG. 8; the results from each sensing channel are found after the measurement of voltage on Cs1 and Cs2 is taken in step F. The duration required for each of the switching elements closures and openings are usually measured in nanoseconds or microseconds, although the step A to reset Cs1 and Cs2 capacitors is perhaps in the millisecond range. The actual or optimal timings depend on circuit specifics such as Cs1 and Cs2 values, switch resistance, and resistance of sensor area 16. For example, a sensor area having very low resistance, such as 10 k ohms, would require switch closure durations of 100 ns or less to prevent crossbleed of charge from Cs1 to Cs2 or vice versa back through the sensor area itself.

During an initial phase of operation, at power up for example, calibration readings can be taken of the baseline or 'background' signals from both channels to obtain 'reference' readings, with no object presumed to be present near the sensor area. These readings may be taken using the same above switching sequences. Once a calibration is taken, only differential readings from each channel are processed in order to calculate position. Further, slow changes in the background level of signals can be compensated for by using 'drift compensation' methods that slowly adjust the 'reference' levels in a slew-rate limited manner during intervals of non-detection.

To compute the position of an object the two sensor readings are processed according to the following steps assuming that the real time acquired signals are Sig1 and Sig2, and the baseline reference levels are Ref1 and Ref2 respectively: 1) Compute the delta signals $\Delta$Sig1, $\Delta$Sig2 from the relations: $\Delta$Sig1=Sig1−Ref1 and $\Delta$Sig2=Sig2−Ref2; 2) Compute the ratio P indicative of position as P=$\Delta$Sig2/($\Delta$sig1+$\Delta$Sig2).

A positive detection is assumed to occur only when the total incremental signal strength ($\Delta$Sig1+$\Delta$Sig2) rises above a minimum threshold value.

P is remarkably free of effects from differently sized objects (e.g. differently sized fingers) and with a linearly increasing resistance along the sensor area an excellent linearity of response is observed.

Controller 26 is operable to receive detection signals from the driver circuitry via the connection 28. The controller 26 is configured to respond to the detection signals is a manner dependent on the detection signal received. For example, if the controller receives detection signals from the driver circuitry which indicate that a user wishes to increase power to heater element 4c, the controller will act accordingly. This can be achieved by providing an appropriate control signal to the electronically controlled triac 30. Any other conventional electronically controlled power control unit may be used to govern the power supplied to the heater elements. The controller 26 is also configured to drive the information displays 18a-18d. In this example the information displays are two-digit LED displays, although LCD or any other type displays could equally be used.

To reduce the chance of unintended activation of certain functions of the hob, for example the switch on function, the controller is operable to only activate these particular functions when a pre-determined combination of sensor areas is appropriately selected. For example, in the control panel 6 shown in FIG. 2, there are two sensor areas which are defined to be associated with the switch-on function of the hob. These are sensor areas 8a and 8b. For a user to turn on the hob, he first selects sensor area 8a by placing his finger, or other pointer, over this sensor area and then within a specified time period, for example 1 second, he selects sensor area 8b, again by placing his finger over the appropriate area. During this process, the driver circuitry initially detects that the user has selected sensor area 8a and outputs a corresponding detection signal to the controller as described above. On receipt of this detection signal, and with the hob currently switched off, the controller does not act to switch on the hob. When the driver circuitry subsequently detects that the user has selected sensor area 8b it outputs a second corresponding detection signal to the controller. Only when the controller receives the two detection signals corresponding to the user selecting sensor areas 8a and 8b within the specified time period does it allow the hob to be switched on. This can be achieved, for example, by the controller driving a main relay (not shown). It will be appreciated that the controller can be adapted to act in response to other pre-determined combinations of selected sensor areas and not just that described above with reference to sensor areas 8a and 8b. For example, instead of requiring two separate sensor areas to be selected within a specified time, in other examples the controller may require a single sensor area to be selected multiple times within a given time period before allowing a hob to be switched on. In yet other cases, two or more sensor areas may require simultaneous selection to allow the hob to be switched on. Although many different pre-determined combinations of selections can be used, the above example of requiring two separate but neighboring sensor areas to be selected in relatively quick succession is easy to perform with a single finger in a single smooth dragging motion from one sensor area to the other.

As is common with many appliances, the sensor areas 8a and 8b which are used to switch the hob on as described above are also used to switch it off. However, because in general it is less dangerous to have an appliance inadvertently switched off than inadvertently switched on, the controller is configured to switch the hob off when either one of sensor areas 8a or 8b is selected. There is no requirement for both sensor areas to be selected within a specified time. In cases where it is desired to prevent an appliance being inadvertently switched off, a similar scheme to that described above for switching on can be similarly employed for the switch off process.

The controller may further be configured to only activate other functions in response to a user making certain pre-determined combinations of multiple selections. This may be done for safety reasons, for example, as with the switch on process, to prevent inadvertent activation of certain functions of the appliance, or may be done to help provide an intuitive and uncluttered control interface.

By way of example, a number of particular operations of the hob and control panel shown in FIGS. 1 to 4 will be described in more detail. It will be appreciated, however, that the layout of the control panel and the preferred mode of operation (e.g. the particular combinations of selections required to activate certain functions described further below) will differ between applications, both according to the functions of the appliance being controlled and the appearance and feel a designer wishes to give the control interface.

As described above, the control panel 6 of FIG. 2 comprises a plurality of proximity sensor areas. Sensor areas 8a and 8b are associated with switching on and off the hob as previously described. Sensor areas 10a-d are heating-element selection sensor areas which respectively correspond to heating elements 4a-d. Sensor area 12 is a "double-ring" selection sensor area and may be used to switch on an extension element 30 of heating element 4a to provide a larger heating area in that part of the hob. Sensor area 14 is a "half-ring" selection sensor area and may be used to toggle between heating element 4d and an inner element 32 to provide a smaller heating area in that part of the hob, as shown in FIG. 1. Sensor area 16 is a slider sensor area which is position sensitive. Information displays 18a-d are respectively associated with heating elements 4a-d and are operable to display (between "00" and "99") a measure the power being supplied to the respective heating elements as a function of the total power available.

A user switches on the hob by selecting sensor areas 8a and 8b in the manner described above. When the hob is first switched on, the default is for no power to be supplied to any of the heating elements 4a-d. The information displays 18a-18d correspondingly all display a value of "00". In other applications, different initial conditions may be preferred. Now suppose a user then wants to use heating element 4a at about 25% of its maximum power. The user first activates control of heating element 4a by placing his finger over heating element selection sensor area 10a. The driver circuitry senses the user's selection and outputs a corresponding detection signal to the controller. In response to this the controller readies itself for receiving further detection signals concerning the action it will be required to take. The controller also informs the user that control of heating element 4a has been activated by increasing the brightness of information display 18a. In other examples a different indication means may be employed, e.g. making the relevant information display flash. The user then places his finger over the slider sensor area 16 to select the amount of power he wishes to apply to heating element 4a. He does this by placing his finger at an appropriate position along the slider sensor area 16. The slider sensor area is marked "C" for cold at its left-hand end and "H" for hot at its right-hand end. In alternative examples a decal graphic may overlay the sensor area, for example, one which is substantially blue towards the cold end of the slider sensor area and substantially red towards the hot end. The amount of power to be supplied to the heating element 4a is determined by where the user positions his finger along the slider. To supply maximum power, he positions his finger at the end marked "H". To supply no power, he positions his finger at the end marked "C". In the present case, where he wishes to supply 25% power, he places his finger approximately 25% of the distance along the slider sensor area. In this example, he happens to have positioned his finger 24% of the distance along the slider sensor area. The driver circuitry detects this location of the user's finger and outputs a corresponding detection signal to the controller. The controller then configures the electronically controllable triac 30 associated with heating element 4a to supply 24% of its maximum power. To inform the user of his selection, the controller configures information display 18a to display the fractional power being supplied to heating element 4a. With 24% of power being supplied, information display 18a displays "23" (i.e. 24% represented on a "00" to "99" scale). The user may be satisfied with this approximation to 25% and withdraw his finger. Alternatively, the user may slide his finger slightly towards the hot end of the slider to increase the power supplied to the heating element.

In addition to the information display 18a, one of a series of LEDs 34 arranged along an edge of the slider sensor area at an appropriate position is illuminated by the controller to allow the user to monitor the presently reported position of his finger on the slider.

After a specified period of time has elapsed with no sensor areas being selected, for example 10 seconds, active control of heater element 4a is relinquished and information display 18a returns to the same brightness as the remaining information displays 18b-d. This prevents subsequent accidental brushing over the slider sensor area 16 from inadvertently adjusting the power supplied to heating element 4a. If the user wants to re-adjust the power supplied to heating element 4a when active control of this heating element has been relinquished he again first selects sensor area 10a to gain active control over the heating element 4a. On doing this, information display 18a again brightens and the heating element 4a may be controlled. The user may now, for example, position his finger over the "double-ring" sensor area to switch on the extension element 30 of heating element 4a.

If the user now wishes to turn on heating element 4d at 18% power, he selects sensor area 10d by placing his finger over that area. This gives him active control of heating element 4d and allows him to position his finger along the slider sensor area in the appropriate position to set the power level as described above. If he wishes to alter this power he may withdraw his finger and re-position it over the slider sensor area 16 at an appropriate place, or he may simply slide his finger over the slider sensor area 16 to continually adjust the power supplied to heating element 4d. When the user has set the power level to heating element 4d at 18%, the control panel appears as shown in FIG. 2.

It will be appreciated that the principles described above may be applied to other configurations of control panel which may comprise different configurations of sensor areas designed to be operated in a different manner.

Figure 9:
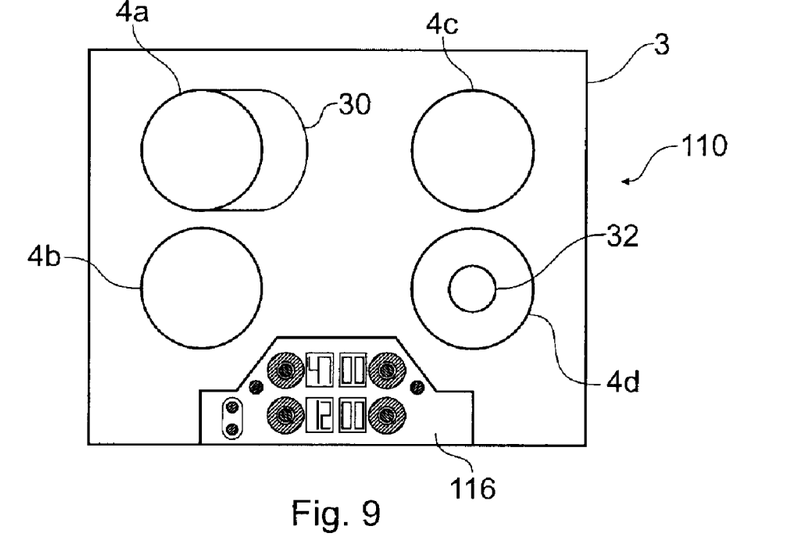
FIG. 9 schematically shows a plan view of a hob according to a second embodiment of the invention.

FIG. 9 schematically shows a plan view of a hob according to a second embodiment of the invention. Many of the features of FIG. 2 are similar to and will be understood from those corresponding features of FIG. 1 having the same reference numerals. These features are not described here further. The hob of FIG. 9 does however have a control panel 116 which is different from that of the hob of FIG. 1. The control panel 116 again allows a user to control various functions of the hob, for example switching on and off and adjusting the temperature of the heating elements, but is designed to function differently to that of the first embodiment.

Figure 10:
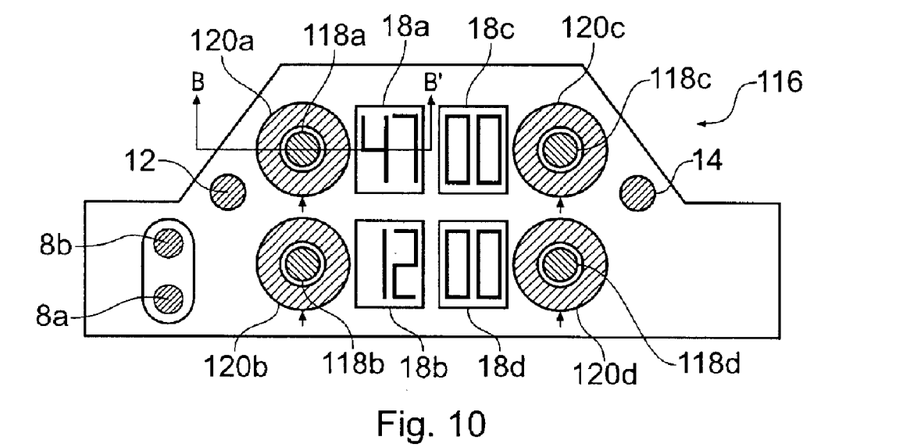
FIG. 10 schematically shows a plan view of a control panel of the hob shown in FIG. 9 on an expanded scale.

FIG. 10 schematically shows a plan view of the control panel 116 of the hob 110 shown in FIG. 9 on an expanded scale. Many of the features of FIG. 10 are similar to and will be understood from those corresponding features of FIG. 2 having the same reference numerals. These features are not described here further. The control panel 116 differs from that of the first embodiment by the manner in which the power supplied to each of the heating elements 4a-d is adjusted. The heating-element selection sensor areas 10a-d and the slider sensor area 16 seen in FIG. 2 are not present on the control panel 116 of the second embodiment of the invention. Instead, each heating element has a corresponding heating-element selection sensor area 118a-d which is surrounded by a rotary position sensor area 120a-d. The glass top 3 overlaying the control panel is slightly modified from that of FIG. 1 in that it contains a shallow recess over the rotary position sensor areas 120a-d to aid a user to slide a finger in a circle over the underlying rotary position sensor areas.

Figure 11:
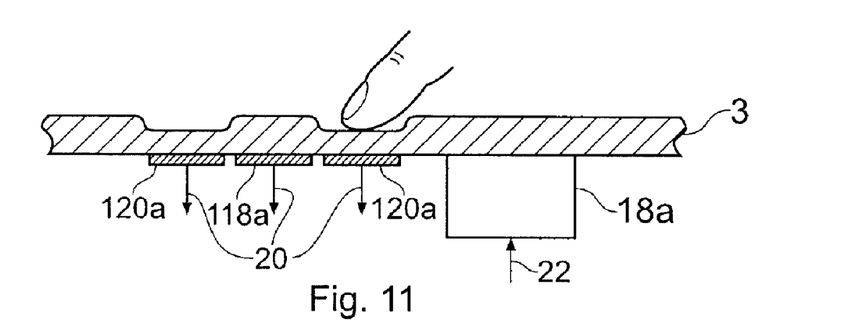
FIG. 11 schematically shows a partial vertical section view of the control panel of FIG. 9.

FIG. 11 schematically shows a partial vertical section view of the control panel 116 of FIG. 10 taken along line B-B' shown in FIG. 10. A section of the glass top 3 is shown with heating-element selection sensor area 1118a, rotary position sensor area 120a and the information display 18a being seen in profile. Because rotary position sensor area 120a comprises a ring it is seen in vertical section on both sides of heating element selection sensor area 118a. One of the recesses in the glass top 3 can be also be seen overlying the rotary position sensor area on either side of the heating element selection sensor. The recess has beveled walls to aid cleaning and prevent dirt accumulation. Sensor areas 118a, 120a are connected to driver circuitry (not shown) by connections 20. Information display 18a is connected to a controller (not shown) by connections 22. Also shown in FIG. 3 is a user's finger positioned over rotary position sensor area 120a.

A user switches on the hob 110 by selecting sensor areas 8a and 8b in the same manner as described above for the first embodiment of the invention. As before, when the hob is first switched on, the default is for no power to be supplied to any of the heating elements 4a-d. The information displays 18a-18d correspondingly all display a value of "00". Now suppose a user wants to use heating element 4a at about 50% of its maximum power. The user first activates control of heating element 4a by placing his finger over the corresponding heating-element selection sensor area 118a. As with the first embodiment, the driver circuitry senses the user's selection and outputs a corresponding detection signal to the controller. In response to this the controller readies itself for receiving further detection signals concerning the action it will be required to take. The controller also informs the user that control of heating element 4a has been activated by increasing the brightness of information display 18a. The user then places his finger over the rotary position sensor area 120a to select the amount of power he wishes to apply to heating element 4a. He does this by placing his linger at an appropriate position around the rotary position sensor area 120a. The rotary position sensor area is marked with an arrow at the 6 o'clock position to identify a start position. The amount of power to be supplied to the heating element 4a is determined by how far the user positions his finger around the rotary position sensor area increasing clockwise from the marked arrow. In the present case, where he wishes to supply 50% power, he places his finger approximately 50% of the angular distance around the rotary position sensor area, i.e. at the 12 o'clock position. In this example, he happens to have positioned his finger 48% of the way around the slider sensor area. Information display 18a is correspondingly configured to display 47 (i.e. 48% on a "00" to "99" scale) and the controller configures the electronically controllable triac associated with heating element 4a to supply 48% of its maximum power. As before the user may be satisfied with the supplied power and withdraw his finger. Alternatively, he may slide his finger slightly clockwise to increase the power supplied to the heating element.

After a specified period of time has elapsed with no sensor areas being selected, for example 10 seconds, active control of heater element 4a is relinquished. This aspect of the hob 110 shown in FIG. 10 is similar to that of the hob of the first embodiment of the invention.

If the user now wishes to turn on heating element 4b at 13% power, he selects sensor area 118b by placing his finger over that area. This gives him active control of heating element 4b and allows him to position his finger around the rotary position sensor area 120b in the appropriate position to set the power level as described above. When the user has set the power level to heating element 4c at 13%, the control panel appears as shown in FIG. 10.

Figure 12:
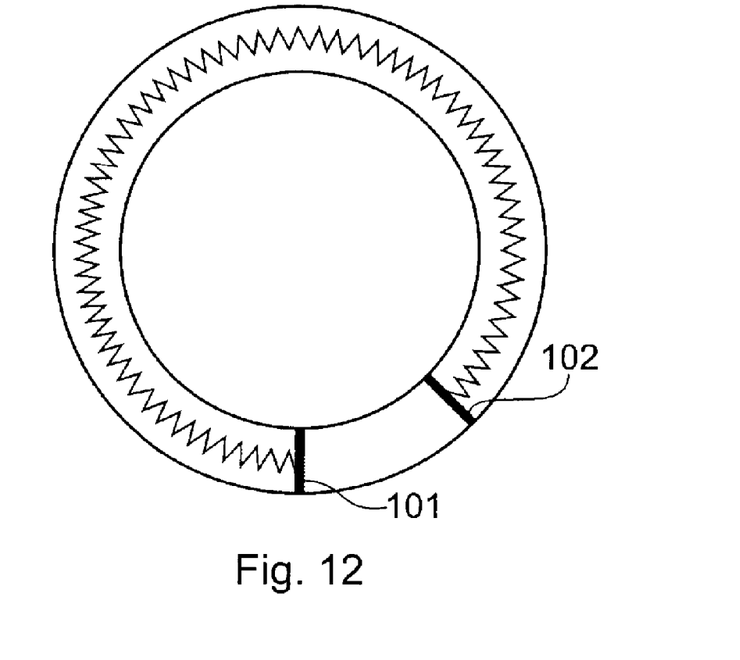
FIG. 12 is a schematic plan view showing part of an exemplar rotary position proximity sensor area which may used in the control panel of FIG. 10.

FIG. 12 shows one example of how each of the rotary position sensor areas 120a-d may be designed. The rotary position sensor area comprises a resistive sensing strip having end terminations 101 and 102 similar to the slider sensor area 16 shown in FIG. 7. However, the resistive sensing strip comprising the rotary position sensor area is formed into a partial ring, extending clockwise from a 6 o'clock position to a 4 o'clock position. This 240 degree angular extent means that the region extending clockwise from the 4 o'clock position to the a 6 o'clock position defines a dead-zone which is not used in this example. The end terminations 101, 102 are connected to driver circuitry (not shown for simplicity) which operates in the same way as that described above with reference to FIG. 7. The single resistive sensing element comprising the rotary position sensor area does not extend in a full ring to avoid confusion near the ends. For example, if the end terminations 101, 102 are too close together, a finger positioned over one end termination will also be effectively positioned close to the other end termination. This means the two sensing channels will generate similar signals and so it will not be possible to determine whether the finger position is close to an end position or at a middle position around the rotary position sensor. This is because the driver circuitry operates on the basis of signal ratios. It is possible to remove this ambiguity with a single fall circle resistive sensing strip using the summed signals from each sensing channel as a discriminator.

Figure 13:
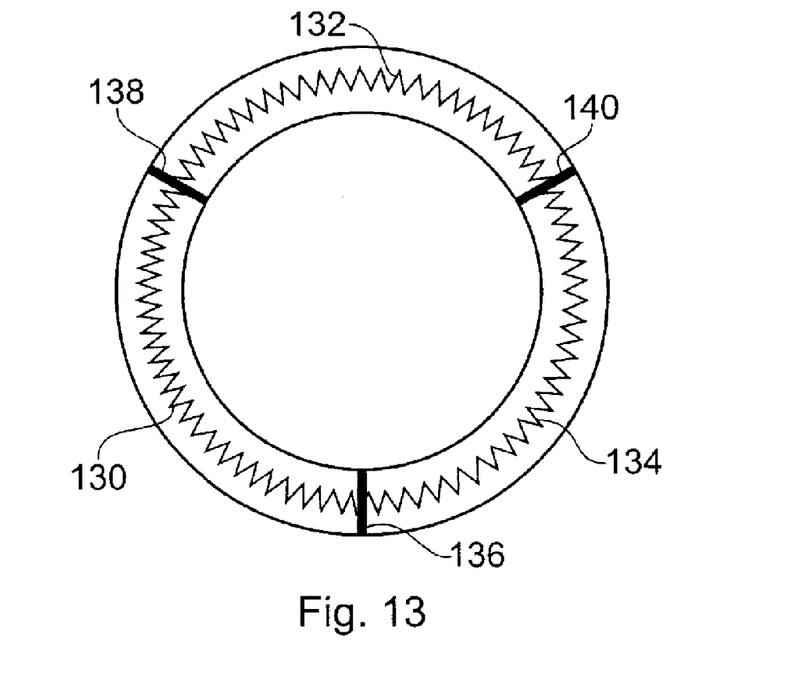
FIG. 13 is a schematic plan view showing part of another example rotary position proximity sensor area which may used in the control panel of FIG. 10.

FIG. 13 shows a second example of how each of the rotary position sensor areas 120a-d may be designed. In this example, the rotary position sensor area is sensitive around a full circle. The rotary position sensor area of FIG. 13 comprises three equiangularly spaced terminations 136, 138, 140 between corresponding pairs of which are connected three resistive sensing strips 130, 132, 134. The three resistive sensing strips each span 120 degrees of arc so as to together form a complete circle as shown in the figure. Each termination 136, 138, 140 is connected to one of three sensing channels which are each similar to the sensing channels seen for each termination 101, 102 in FIG. 7. The position of a finger positioned over any one the resistive sensing elements 130, 132, 134 can be determined in a manner similar to that described above with reference to FIG. 7. For example, signals from the sensing channels associated with terminations 136 and 138 are used to determine whether a finger is positioned over the resistive sensing element 130, and if so at what position. Signals from the sensing channels associated with terminations 138 and 140 are used to determine whether a finger is positioned over the resistive sensing element 132, and if so at what position. Signals from the sensing channels associated with terminations 140 and 136 are used to determine whether a finger is positioned over the resistive sensing element 134, and if so at what position. Where a finger is positioned close to a terminal such that is detected as being over two neighboring resistive elements, the pair of sensing channels returning the largest summed signal is used. Where a finger is positioned directly over a terminal, the summed signals from the pair of sensing channels associated with each of the neighboring resistive sensing elements will nominally be the same and either pair of signals can be used.

It will be appreciated that the principles of the above described invention are not limited to hobs but are applicable to many other types of appliance. For example, similar control panels can be used with many different kinds of domestic appliance such as ovens, grills, washing machines, tumble-dryers, dish-washers, microwave ovens, food blenders, bread makers, drinks machines and so forth. Furthermore, although in the above examples the control panel is formed beneath a glass top of a hob, in other examples the control panel may be remote from the appliance or otherwise mounted, for example on a vertical face of the appliance. It is also possible to provide a control panel similar to those kind described above which is provided separately from an appliance which it may be used to control. For example to provide an upgrade to a pre-existing appliance. It is also possible to provide a control panel which may be configured to operate a range of different appliances. For example, a control panel having a given range of proximity sensor areas which an appliance provider may associated with functions of an appliance as he wishes by appropriately configuring the logic of the controller. For example, by reprogramming the controller.

Figures 14, 15, 16, 18:
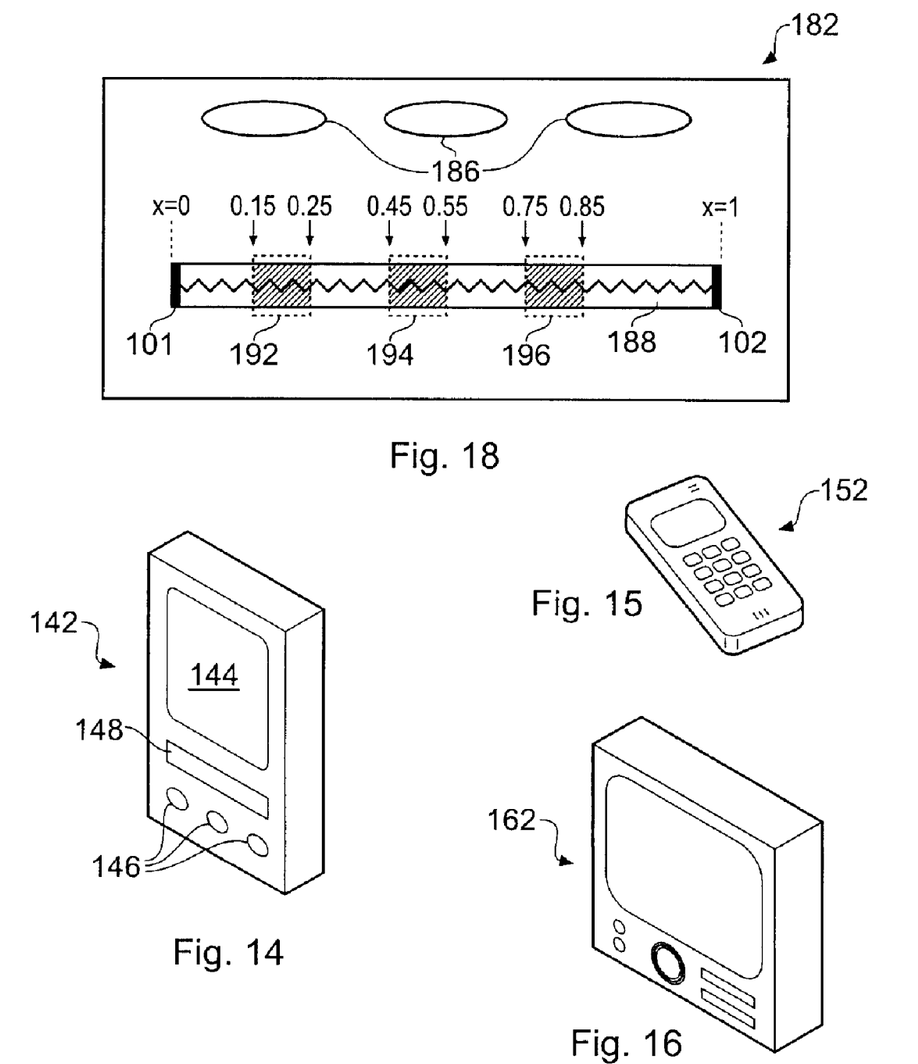
FIGS. 14 to 17 schematically show appliances according to embodiments of the invention.
FIG. 18 schematically shows a control panel according to another embodiment of the invention.

FIG. 14 schematically shows another appliance, in this case a portable media player 142, according to an embodiment of the invention. The device has a screen 144 for displaying a listing of available audio files to a user and includes three proximity sensor areas 146 and a slider position sensitive sensor area 148. These sensor areas 146, 148 provide an interface through which the user can input instructions to be executed, and so control the operation of the device. The media player 142 further includes driver circuitry (not shown) operable to output detection signals in response to selection of the proximity sensor areas by a user (e.g. by the user placing a finger or other pointing object, such as a stylus, adjacent a sensor area to indicate a selection) and a controller (not shown) operable to activate certain functions of the device in response to receipt of a pre-determined combination of at least two of said detection signals. For example, in this case the portable media player may be configured to switch off only if two of the proximity sensor areas 146 are selected together. Similarly, it may be configured to increase output volume to a level determined by the position of a touch to the position sensitive sensor area 148 only if the touch is made within a set time period following a selection of one of the proximity sensor areas 146. Thus accidental activation of functions of the appliance, for example when in a user's pocket, can be avoided.

Figure 17:
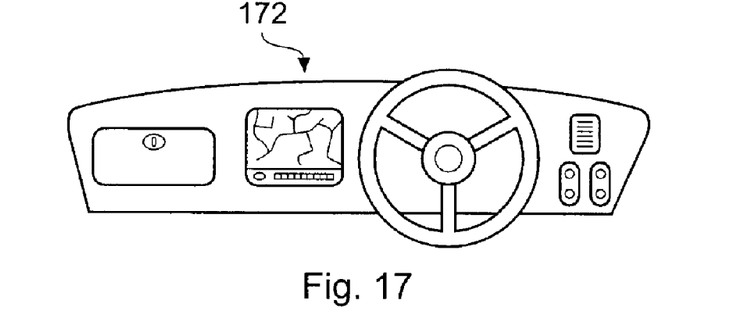

More generally the invention may be used in conjunction with any appliance having a human-machine interface. For example. FIG. 15 schematically shows a mobile telephone (cell phone) 152, FIG. 16 shows a domestic television set 162, and FIG. 17 shows an automobile dashboard 172. All of these appliances include control panels according to embodiments of the invention such that certain functions of the respective appliances are activated in response to receipt of a pre-determined combination of at least two detection signals associated with one or more proximity sensor areas. The particular function will depend on the implementation at hand and the wishes of the designer of the user interface.

FIG. 18 schematically shows a capacitive touch-sensitive control panel 182 for an appliance according to another embodiment of the invention. The control panel comprises three proximity sensor areas 186 and a slider position sensitive sensor area 188. Driver circuitry (not shown) is associated with the sensor areas and is operable to output detection signals to a controller (also not shown) in response to selection of the sensor areas by a user. The controller is configured to activate functions of the appliance in response to receipt of a pre-determined combination of at least two detection signals. The slider position sensitive sensor area 188 can be considered to provide a series of arbitrarily definable individual proximity areas. For example in this case the slider position sensitive sensor area 188 has a sensitive area extending along an x-direction from x=0 to x=1 and is considered to provide a first proximity sensor area 192 extending between x=0.15 and x=0.25, a second proximity sensor area 194 extending between x=0.45 and x=0.55 and a third proximity sensor area 196 extending between x=0.75 and x=0.85. Thus a determination that a touch is made between x=0.15 and x=0.25 corresponds to selection of the first proximity sensor area 192 giving rise to a corresponding detection signal. Similarly a determination that a touch is made between x=0.45 and x=0.55 corresponds to selection of the second proximity sensor area 194, and so on for the third proximity sensor area 196. A touch outside of the first, second and third proximity sensor areas defined within the active area of the slider is ignored, or may be deemed to correspond to selection of some other proximity sensor area.

Thus in a given implementation, the appliance being controlled might be switched on (or some other function performed) only in response to the first 192, second 194, and third 196 proximity sensor areas being selected by a user in order and within a given time frame. Thus the appliance can be configured such that it is switched on when a user moves their hand or other object in a sliding gesture over the slider position sensitive sensor area 188.

Although the examples given above are based on capacitance based touch-sensitive controls, other touch-sensitive technologies may also be used. For example resistance-based touch-sensitive screens or infra-red detection based touch-sensitive screens may also be used.

It will be appreciated that although particular embodiments of the invention have been described, many modifications/additions and/or substitutions may be made within the spirit and scope of the present invention.

What is claimed is:

1. A touch-sensitive control panel for controlling an appliance comprising:
a single position sensitive proximity slider sensor area that includes a sensing strip having first and second end terminals;
driver circuitry that includes a first measurement circuit, a second measurement circuit, a first switching circuit, a second switching circuit and a switching control circuit, the first measurement circuit operating to create a first output detection signal that is indicative of touch locations relative to a first portion of the single position sensitive proximity slider sensor area and the second measurement circuit operating to create a second output detection signal that is indicative of touch locations relative to a second portion of the single position sensitive proximity slider sensor area, wherein the first switching circuit includes first, second and third switching elements coupled to a first sampling capacitor and the second switching circuit includes first, second and third switching elements coupled to a second sampling capacitor; and
a controller operable to receive the first and second detection signals from the driver circuitry and to activate different functions of the appliance in response thereto, wherein the controller is operable to activate at least one function of the appliance responsive to receipt of a pre-determined combination of the first and second detection signals.

2. The touch-sensitive control panel of claim 1 wherein the position sensitive proximity sensor area is a resistive strip.

3. The touch-sensitive control panel of claim 2 wherein the first portion of the position sensitive proximity sensor area is one end of the resistive strip and the second portion of the position sensitive proximity sensor area is an opposing end of the resistive strip.

4. An apparatus comprising:
a touch-sensitive control panel that includes a discrete position sensitive proximity sensing single conductor;
a first measurement circuit that includes a first sampling capacitor which creates a first output detection signal indicative of touch positions relative to a first portion of the sensing single conductor;
a second measurement circuit that includes a second sampling capacitor which creates a second output detection signal indicative of touch positions relative to a second portion of the sensing single conductor; and
a controller that receives the first and second detection signals from the first and second measurement circuits, the controller activating different functions of the apparatus in response to a pre-determined combination of detection signals, wherein the detection signals are indicative of different touch positions within the first portion of the sensing single conductor and the second portion of the sensing single conductor.

5. The apparatus of claim 4, wherein the pre-determined combination of detection signals corresponds to a user selecting different touch positions within the first portion of the sensing single conductor and the second portion of the sensor area at different times.

6. The apparatus of claim 5, wherein the pre-determined combination of detection signals corresponds to a user selecting the different touch positions within a specified time period.

7. The apparatus of claim 4, wherein the sensing single conductor is a linear position sensitive sensing single conductor.

8. The apparatus of claim 4, wherein sensing single conductor is a rotary position sensitive sensing single conductor.

9. A method comprising:
using a first measurement circuit that is coupled to a first sampling capacitor to detect a first touch position relative to a first portion of a discrete position sensitive proximity sensing single conductor;
generating a first output detection signal that is indicative of the first touch position relative to the first portion of the sensing single conductor;
using a second measurement circuit that is coupled to a second sampling capacitor to detect a second touch position relative to a second portion of the discrete position sensitive proximity sensing single conductor;
generating a second output detection signal that is indicative of the second touch position relative to the second portion of the sensing single conductor;
sending the first and second output detection signals to a controller; and
activating a function of an apparatus with the controller based on a pre-determined combination of the first and second output detection signals that are received by the controller and are associated with the function.

10. The method of claim 9, wherein activating a function of the apparatus with the controller based on a pre-determined combination of the first and second output detection signals that are received by the controller includes selecting the first and second touch positions within the sensing single conductor at different times.

11. The method of claim 10, wherein selecting the first and second touch positions within the sensor area at different times includes sliding an object from the first portion of the sensing single conductor to the second portion of the sensing single conductor.

12. The method of claim 11, sliding an object from the first portion of the sensing single conductor to the second portion of the sensor area includes sliding a finger from the first portion of the sensing single conductor to the second portion of the sensing single conductor.

13. The method of claim 10, wherein selecting the first and second touch positions within the sensing single conductor at different times includes selecting the first and second touch positions within a specified time period.

14. The method of claim 9, wherein activating a function of the apparatus includes turning on the apparatus.

15. An apparatus comprising:
a first measurement circuit coupled to a first sampling capacitor, the first measurement circuit being connected to a first end of a discrete slider sensing single conductor to create a first output detection signal that is indicative of a first touch position relative to a first portion of the slider sensing single conductor;
a second measurement circuit coupled to a second sampling capacitor, the second measurement circuit being connected to a second end of the discrete slider sensing single conductor to create a second output detection signal that is indicative of a second touch position relative to a second portion of the slider sensing single conductor; and
a controller to receive the first and second output detection signals from the first and second measurement circuits and activate different functions of the apparatus in response to receiving a predetermined sequence of first and second output detection signals within a predetermined period of time.

16. The touch-sensitive control panel of claim 15 wherein the slider sensing single conductor is a resistive strip.

17. The touch-sensitive control panel of claim 16 wherein the first portion of the slider sensing single conductor is one end of the resistive strip and the second portion of the position sensitive proximity sensing single conductor is an opposing end of the resistive strip.

18. The apparatus of claim 17, wherein the resistive strip is a linear resistive strip.

* * * * *

UNITED STATES PATENT AND TRADEMARK OFFICE
CERTIFICATE OF CORRECTION

PATENT NO. : 7,969,330 B2
APPLICATION NO. : 11/163944
DATED : June 28, 2011
INVENTOR(S) : Philipp Page 1 of 1

It is certified that error appears in the above-identified patent and that said Letters Patent is hereby corrected as shown below:

In the Specification

Column 12, Line 43 after "sensor area" delete "1118a" and insert -- 118a --.

Column 13, Line 9 after "placing his" delete "linger" and insert -- finger --.

Signed and Sealed this
Nineteenth Day of November, 2013

Teresa Stanek Rea
*Deputy Director of the United States Patent and Trademark Office*